Patented Feb. 11, 1941

2,231,818

UNITED STATES PATENT OFFICE 2,231,818

PLASTICIZED CELLULOSE ACETATE COMPOSITIONS

Ernest A. Rodman, Newburgh, N. Y., assignor to E. I. du Pont de Nemours & Company, Wilmington, Del., a corporation of Delaware No Drawing. Application January 31, 1939, Serial No. 253,886

5 Claims. (Cl. 106—40)

This invention relates to plasticized compositions of cellulose esters and more particularly to plasticized compositions of cellulose acetate and still more particularly to cellulose acetate compositions containing a composite plasticizer made up from a selected combination of simple plasticizers.

This invention has as its object the preparation of cellulose acetate compositions which will form films or sheets which are extremely tough and flexible at low temperatures such as −18° C. Another object is the preparation of cellulose acetate compositions which can be laminated with glass to form so-called safety-glass of improved toughness at low temperatures. A further object is the preparation of cellulose acetate compositions which do not lose their toughness to an excessive amount of elevated temperatures such as 48° C. A still further object is the preparation of cellulose acetate compositions which are exceptionally tough and which have exceptional adhesion for glass over a wide range of temperatures. A still further object is the preparation of tough and flexible cellulose acetate compositions which may be applied to a flexible base material. Other objects will appear hereinafter.

These objects are accomplished by the following invention which consists in combining with the cellulose acetate a composite plasticizer which includes at least one simple plasticizer selected from each of three cellulose acetate plasticizer groups, the first of which consists of trialkyl phosphates in which the alkyl group has 4 to 5 carbon atoms, the second of which is a cellulose acetate-solvent group consisting of dimethyl phthalate and dimethoxyethyl phthalate, and the third of which is a cellulose acetate-non-solvent group which consists of diethylene glycol dibutyrates, diethylene glycol divalerates, triethylene glycol dipropionates, triethylene glycol dibutyrates, diethyl phthalate, and dipropyl phthalates.

This invention is more fully described in the following examples in which the quantities of materials are expressed as parts by weight.

Example I

Films having exceptionally good toughness at −18° C. were prepared from a solution of the following composition:

| | Parts |
|---|---|
| Cellulose acetate (37.4% acetyl) | 100 |
| Tributyl phosphate | 35 |
| Dimethyl phthalate | 30 |
| Diethylene glycol diisobutyrate | 35 |
| Acetone | 570 |

The films of approximately 0.005 inch thickness prepared from the above solution, after being seasoned to remove the acetone, were tested on the Miles impact tester with the following results: at 25° C. the films had an impact test of 0.4 inch with #1 hammer and, at −18° C., 0.7 inch with hammer #2. The Miles impact testing machine consists essentially of a means for dropping one of three interchangeable hammers on a 3" x 2" film, folded (but not creased) lengthwise. The toughness is expressed as the length, in inches, of the crack produced in the test film—the shortest crack lengths indicating the toughest films. Hammer #1 is about three times as drastic as hammer #2 and about three and one-half times as drastic as hammer #4. The test values for all the films described in this application have been corrected for slight variations in film thickness. A 0.005 inch thick film of cellulose acetate plasticized with 85 parts of dimethyl phthalate (which is representative of the acetate sheeting now used in the manufacture of safety glass) has the following Miles impact test values: 1.4 inches with hammer #1 at 25° C. and 1.8 inches with hammer #4 at −18° C.

Example II

A film was prepared from a solution of the following ingredients in the same manner as in Example I.

| | Parts |
|---|---|
| Cellulose acetate | 100 |
| Tributyl phosphate | 66 |
| Dimethyl phthalate | 36 |
| Diethylene glycol diisobutyrate | 18 |
| Acetone | 570 |

A film prepared from this composition had the following impact test values: 0.2 inch with hammer #1 at 25° C. and 0.8 inch with hammer #2 at −18° C.

Example III

| | Parts |
|---|---|
| Cellulose acetate | 100 |
| Tributyl phosphate | 10.5 |
| Dimethyl phthalate | 14 |
| Diethylene glycol diisobutyrate | 45.5 |
| Acetone | 570 |

A film prepared in the usual manner from the above described solution gave the following impact test values: 0.4 inch with hammer #1 at 25° C. and 0.9 inch with hammer #2 at −18° C.

Example IV

The procedure described in Example I was also used to prepare a film from a solution of the following composition:

| | Parts |
|---|---|
| Cellulose acetate | 100 |
| Tributyl phosphate | 30 |
| Dimethyl phthalate | 45 |
| Diethyl phthalate | 25 |
| Acetone | 570 |

The seasoned film of this composition gave an impact test of 0.7 inch with hammer #1 at 25° C. and 1.3 inches with hammer #2 at —18° C.

Example V

Again following the procedure described in Example I a film was prepared from the following composition dissolved in acetone:

| | Parts |
|---|---|
| Cellulose acetate | 100 |
| Tributyl phosphate | 15 |
| Dimethoxyethyl phthalate | 15 |
| Diethylene glycol diisobutyrate | 70 |

This film gave the following impact test values: 0.5 inch with hammer #1 at 25° C. and 0.8 inch with hammer #2 at —18° C.

Example VI

The procedure described above was also used to prepare a film from a solution of the following composition:

| | Parts |
|---|---|
| Cellulose acetate | 100 |
| Triisobutyl phosphate | 35 |
| Dimethyl phthalate | 30 |
| Diethylene glycol diisobutyrate | 35 |
| Acetone | 570 |

The resulting film had impact tests of 0.5 inch with hammer #1 at 25° C. and 0.8 inch on hammer #2 at —18° C.

Example VII

Plastic sheeting was prepared from the following ingredients:

| | Parts |
|---|---|
| Cellulose acetate | 100 |
| Tributyl phosphate | 30 |
| Dimethyl phthalate | 45 |
| Diethyl phthalate | 25 |
| Denatured alcohol | 30 |
| Acetone | 10 |

The ingredients were colloided in a Werner and Pfleiderer mixer, filtered by hydraulic pressure through heavy muslin, rolled to remove volatile solvents, consolidated by heat and pressure into blocks, and from these blocks sheets of approximately 0.025 inch thickness were sliced. These sheets were seasoned under conditions which remove substantially all of the volatile solvents but no substantial part of the plasticizer. This sheeting was then laminated between glass plates and subjected to the standard break tests as used in testing regular safety glass. These laminations had the following break tests when tested with a ½ lb. steel ball: 18 feet at 0° F. (—18° C.), 28 feet at 70° F. (21° C.), and 29 feet at 120° F. (48° C.). The corresponding break test values for laminations made with an interlayer containing 85 parts of dimethyl phthalate to 100 parts of cellulose acetate (which is now used for the manufacture of safety glass) are: 2.5–5 feet at —18° C., 20 feet at 25° C., and 25–30 feet at 48° C.

Example VIII

A colloid was prepared in the same manner as that described in Example VII from the following ingredients:

| | Parts |
|---|---|
| Cellulose acetate | 100 |
| Tributyl phosphate | 35 |
| Dimethyl phthalate | 30 |
| Diethylene glycol diisobutyrate | 35 |
| Denatured alcohol | 30 |
| Acetone | 30 |

In this example the colloid after being filtered was extruded into brine to give sheeting which was 0.033–0.037 inch thick after being seasoned to remove the volatile solvents. Laminated glass prepared with this sheeting as the interlayer gave the following break tests (using the standard procedure with the ½ lb. ball): 18 feet at 0° F. (—18° C.), 27 feet at 70° F. (21° C.), and 26 feet at 120° F. (48° C.).

Example IX

Acetate sheeting of 0.001 inch thickness and of the following composition:

| | Parts |
|---|---|
| Cellulose acetate (40.0% acetyl) | 100 |
| Tributyl phosphate | 11.7 |
| Dimethyl phthalate | 10 |
| Diethylene glycol diisobutyrate | 11.7 | was prepared by spreading an acetone solution of the above ingredients on a suitable support and then evaporating the solvent. The resulting acetate sheeting had a durability considerably greater than that of regular acetate sheeting. Durability values of 37 at room temperature and 8 at 0° F. (—18° C.) were obtained on this film, in comparison with corresponding values of 18 and 3 for regular acetate thin sheeting which has a composition of 33 parts of dimethoxyethyl phthalate to 100 parts of cellulose acetate.

Example X

A cellulose acetate composition suitable for application to flexible base materials such as, e. g., cloth, paper, etc., comprising the following:

| | Parts |
|---|---|
| Cellulose acetate | 100 |
| Tributyl phosphate | 15 |
| Diethyl phthalate | 35 |
| Dimethoxyethyl phthalate | 100 |
| Barium base titanium pigment | 300 |
| Acetone | 400 | was prepared by dispersing the cellulose acetate in the acetone and separately dispersing the pigment in the plasticizer mixture after which the two dispersions were intimately mixed.

Compositions similar to the above containing very little or no volatile solvent may also be prepared by kneading the cellulose acetate and plasticizer in a suitable mixing machine such as a Werner and Pfleiderer or Banbury mixer until a homogeneous colloid is obtained. To this colloid, comprising the cellulose acetate and plasticizer, is added a small amount of a lubricant which is practically incompatible with the cellulose acetate composition, such as oleic acid, methyl and ethyl stearate, coconut oil, white oil, etc. This composition is then mixed with the pigment on milling rolls. Such compositions are suitable for application to flexible base materials by means of calender rolls.

The above examples are merely illustrative of some of the plasticizer combinations and proportions included in this invention. Other examples of compounds of the first group as defined previously which may be used instead of the tributyl or isobutyl prosphates are the triamyl phosphates in similar proportions. Another example of the second group of plasticizers which may be used in place of dimethyl phthalate is dimethoxyethyl phthalate. Examples of other compounds which are included under plasticizers of the third group are triethylene glycol dipropionate and diethylene glycol divalerate, di-n-propyl and diisopropyl phthalates.

The total proportion of plasticizer mixture to cellulose acetate may be varied over wide limits depending on the particular use for which the plastic sheeting is desired. Sheeting to be laminated with glass may contain from 70 to 120 parts of plasticizer mixture to 100 parts of cellulose acetate. The preferred proportions are from 80 to 100 parts of plasticizer mixture to 100 parts of cellulose acetate. However, if more rigid sheeting is desired, the total proportion of plasticizer may be reduced to from 25 to 50 parts to 100 parts of cellulose acetate. If sheeting which will be suitable for wrapping foil is desired, the preferred proportion of plasticizer will be 33 parts to 100 parts of cellulose acetate. In other applications of this invention, such as the manufacture of coated flexible base materials, it is sometimes desired to employ as high as 200 parts of the plasticizer mixture to 100 parts of cellulose acetate.

The proportion of each simple plasticizer in any of the total concentrations described above may be varied over rather wide limits. The total mixture may be composed of 10–75% of a plasticizer of the first group, 10–60% of a plasticizer of the second group, and 15–70% of a plasticizer of the third group, the proportions being so chosen, of course, as to total 100%. The preferred proportion of each simple plasticizer depends on the specific properties of the compound selected, such as solvent power, compatibility, and toughening action on the type of cellulose acetate employed. For example, if the tributyl phosphate of Example I is replaced with triamyl phosphate, a smaller proportion of the amyl derivative should be used to obtain optimum results. Likewise if diethylene glycol divalerate is substituted for the diethylene glycol diisobutyrate of Example I, a smaller proportion should be used and a correspondingly larger proportion of dimethyl phthalate may be used. In formulating these compositions, the compounds represented by the three different plasticizer groups included in this invention may be considered to impart certain properties to the resulting film or sheet. The compounds represented by the first and third groups are effective in imparting toughness to the resulting film or sheet, and those of the first group are particularly effective at low temperatures. However, the compounds of both these groups are not sufficiently good solvents for cellulose acetate at higher temperatures, and, if too large a proportion of these is used, the sheeting cannot be laminated satisfactorily with glass because at the temperature necessary for lamination these plasticizers exude and in some cases cause a whitening of the interlayer. The compounds represented by the second group are good solvents for cellulose acetate and are added primarily to obtain the necessary solvent power in the mixture to prevent the plasticizer composition from exuding at the temperature of lamination.

In the manufacture of the sheeting for plastic interlayers, any of the usual methods may be employed. The volatile solvent, of course, may be varied widely both as to kind and amount, as will be understood by those skilled in the art. As examples of other solvents which are suitable may be mentioned methyl ethyl ketone, ethyl acetate (for certain types of cellulose acetate), and dioxan. Mixtures of these solvents may also be employed. The film or sheeting may be prepared by a solvent casting process or by the plastic process as described in the examples. The sheeting or film may be seasoned to remove volatile solvent by either exposure to air at elevated temperatures or by immersion in brine of suitable concentration to dissolve the volatile solvent without removing substantially any of the plasticizer mixture.

The cellulose acetate which can be used in these improved compositions may be any of the commercial acetates having acetyl contents of 36 to 42%. For safety glass interlayers the preferred type of acetate is usually that containing about 37% acetyl. For coatings on flexible base materials the preferred type of acetate is that containing about 40% acetyl. However, other types may be used for these purposes if desired.

The cellulose acetate compositions included in this invention are exceptionally well suited to be used as the plastic interlayer in laminated safety glass. They are also well suited for the preparation of film and sheeting where thin sheeting of extremely high toughness and durability is desired. A further use of the compositions included in this invention is for the coating of flexible base materials in the manufacture of bookbinding material, cleanable tablecloths, cleanable adhesive tape material, upholstery, window shades, etc.

The cellulose acetate compositions of this invention are particularly suitable for use as interlayers in the manufacture of safety glass because these compositions have good toughness at low temperatures (—18° C.) and at the same time have sufficient solvent action at high temperatures (140° C.) to prevent the plasticizer from exuding and causing poor adhesion of the glass to the plastic interlayer. Moreover, the compositions of this invention are sufficiently rigid that the resulting laminated glass can be used in various applications without causing difficulty in glazing. The use of diethylene glycol diisobutyrate and mixtures of this compound with solvent plasticizers such as dimethyl phthalate in safety glass laminations has been disclosed in U. S. Patent 2,040,937. However, I have found that if cellulose acetate sheets plasticized with a mixture of 45–65 parts of diethylene glycol diisobutyrate and 45–35 parts of dimethyl phthalate to 100 parts of cellulose acetate (these specific proportions being included in the compositions disclosed in this patent) are heated to 140° C.; some of the plasticizer mixture exudes at this temperature. On the other hand, if a third plasticizer, a trialkyl phosphate such as tributyl or triisobutyl phosphate, is added to the previously mentioned plasticizer mixture, the resulting acetate composition does not exude as much under the same conditions. This is entirely unexpected because a cellulose acetate sheet plasticized with a correspondingly high proportion of trialkyl phosphate alone exudes greatly at 140° C. The non-exuding characteristics of the plasticizer compositions of this invention result in the formation of laminated safety glass having much better adhesion. It is true that the additions of higher proportions of the solvent plasticizer, dimethyl phthalate, will also improve the exudation characteristics of a cellulose acetate sheeting. However, if too high a proportion of this plasticizer is used, the resulting composition has lost a considerable proportion of its toughness at low temperature.

This invention is not limited to the specific embodiments herein disclosed, it being understood that all obvious variations and equivalents falling within the spirit of the invention are to be included within the scope thereof as defined by the following claims.

I claim:

1. A composition of matter comprising cellulose acetate plasticized with from about 70 to about 120 parts of a composite plasticizer per 100 parts of cellulose acetate, the composite plasticizer consisting of about 15% to about 75% of plasticizer from the group consisting of trialkyl phosphates in which the alkyl group has 4 to 5 carbon atoms, of about 10% to about 60% of plasticizer from the group of cellulose acetate-solvents consisting of dimethyl phthalate and dimethoxyethyl phthalate, and of about 15% to about 70% of plasticizer from the group of cellulose acetate-non-solvents consisting of diethylene glycol dibutyrates, diethylene glycol divalerates, triethylene glycol dipropionates, triethylene glycol dibutyrates, diethyl phthalate, and dipropyl phthalates.

2. A composition of matter according to claim 1 comprising from about 80 to about 100 parts of composite plasticizer per 100 parts of cellulose acetate, said composition being especially suitable as the interlayer in laminated safety glass.

3. A composition of matter according to claim 1 wherein the composite plasticizer consists of tributyl phosphate, dimethyl phthalate, and diethylene glycol diisobutyrate.

4. A composition of matter according to claim 1 wherein the composite plasticizer consists of tributyl phosphate, dimethyl phthalate, and diethyl phthalate.

5. A composition of matter according to claim 1 wherein the composite plasticizer consists of triisobutyl phosphate, dimethyl phthalate, and diethylene glycol diisobutyrate.

ERNEST A. RODMAN.